(12) United States Patent
Deng et al.

(10) Patent No.: US 10,686,551 B2
(45) Date of Patent: Jun. 16, 2020

(54) WIRELESS COMMUNICATION CONTROL METHOD AND DEVICE

(71) Applicant: SZ DJI TECHNOLOGY CO., LTD., Shenzhen (CN)

(72) Inventors: Renqin Deng, Shenzhen (CN); Desheng Yuan, Shenzhen (CN); Zhongqian You, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 130 days.

(21) Appl. No.: 15/722,520

(22) Filed: Oct. 2, 2017

(65) Prior Publication Data

US 2018/0026741 A1 Jan. 25, 2018

Related U.S. Application Data

(63) Continuation of application No. PCT/CN2015/075546, filed on Mar. 31, 2015.

(51) Int. Cl.
| | |
|---|---|
| *H04L 1/00* | (2006.01) |
| *H04B 1/10* | (2006.01) |
| *H04B 17/336* | (2015.01) |
| *H04W 28/18* | (2009.01) |
| *H04B 1/715* | (2011.01) |
| *H04B 1/713* | (2011.01) |

(Continued)

(52) U.S. Cl.
CPC ............ *H04L 1/0015* (2013.01); *H04B 1/10* (2013.01); *H04B 17/336* (2015.01); *H04L 1/00* (2013.01); *H04L 1/0003* (2013.01); *H04L 1/0009* (2013.01); *H04W 28/18* (2013.01); *H04B 1/1027* (2013.01); *H04B 1/713* (2013.01); *H04B 1/715* (2013.01); *H04B 2001/7154* (2013.01); *H04J 11/0023* (2013.01); *H04W 72/082* (2013.01)

(58) Field of Classification Search
None
See application file for complete search history.

(56) References Cited

U.S. PATENT DOCUMENTS 8,780,733 B2 * 7/2014 Jeon ...................... H04L 1/1825
370/233
9,521,579 B1 * 12/2016 Mudulodu ........ H04W 72/0446
(Continued)

FOREIGN PATENT DOCUMENTS

| CN | 101080085 A | 11/2007 |
| CN | 101317346 A | 12/2008 |

(Continued)

OTHER PUBLICATIONS

The World Intellectual Property Organization (WIPO) International Search Report and Translation of Writted Opinion for PCT/CN2015/075546 dated Jan. 11, 2016 8 Pages.

*Primary Examiner* — Andrew C Oh
(74) *Attorney, Agent, or Firm* — Anova Law Group, PLLC

(57) ABSTRACT

A wireless communication control method includes estimating a signal-to-interference-plus-noise ratio (SINR) of a current channel based upon historical SINR measurements, obtaining a transmission error rate of a current traffic, and determining a wireless communication control scheme based upon the SINR of the current channel and the transmission error rate.

17 Claims, 6 Drawing Sheets

(51) Int. Cl.
*H04J 11/00* (2006.01)
*H04W 72/08* (2009.01)

(56) References Cited

U.S. PATENT DOCUMENTS

| | | | | |
|---|---|---|---|---|
| 2003/0123598 A1* | 7/2003 | Gollamudi | ............ | H04L 1/0003 375/377 |
| 2005/0238108 A1* | 10/2005 | Suh | ............ | H04L 1/0001 375/260 |
| 2006/0018365 A1* | 1/2006 | Jung | ............ | H04B 1/715 375/132 |
| 2006/0128318 A1* | 6/2006 | Agarossi | ............ | H04L 1/0003 455/69 |
| 2007/0002742 A1* | 1/2007 | Krishnaswamy | ............ | H04W 72/1242 370/235 |
| 2007/0238430 A1* | 10/2007 | Himayat | ............ | H04B 17/345 455/226.3 |
| 2009/0154574 A1* | 6/2009 | Thurfjell | ............ | H04L 1/0003 375/259 |
| 2011/0002371 A1* | 1/2011 | Forenza | ............ | H04B 7/0417 375/227 |
| 2011/0003608 A1* | 1/2011 | Forenza | ............ | H04B 7/01 455/501 |
| 2011/0021236 A1* | 1/2011 | Dinan | ............ | H04W 52/262 455/522 |
| 2011/0044193 A1* | 2/2011 | Forenza | ............ | H04B 7/0626 370/252 |
| 2011/0044231 A1* | 2/2011 | Shahar | ............ | H04L 5/0037 370/312 |
| 2011/0085512 A1* | 4/2011 | Lin | ............ | H04W 4/20 370/329 |
| 2012/0243473 A1* | 9/2012 | Kadous | ............ | H04W 72/1215 370/328 |
| 2012/0264468 A1* | 10/2012 | Turtinen | ............ | H04L 5/001 455/509 |
| 2012/0287883 A1* | 11/2012 | Sabella | ............ | H04L 1/0003 370/329 |
| 2012/0314570 A1* | 12/2012 | Forenza | ............ | H04B 7/024 370/230 |
| 2014/0321521 A1* | 10/2014 | Lee | ............ | H04W 24/02 375/227 |
| 2015/0003268 A1* | 1/2015 | Wang | ............ | H04W 72/08 370/252 |
| 2015/0071083 A1* | 3/2015 | Rocchetti | ............ | H04L 1/0025 370/242 |
| 2015/0215069 A1* | 7/2015 | Lin | ............ | H04L 1/0009 370/329 |
| 2016/0113044 A1* | 4/2016 | Subasic | ............ | H04W 76/10 455/436 |
| 2016/0227489 A1* | 8/2016 | Oteri | ............ | H04W 52/243 |
| 2016/0381666 A1* | 12/2016 | Kim | ............ | H04L 5/0055 370/329 |
| 2017/0127449 A1* | 5/2017 | Wang | ............ | H04W 74/0816 |
| 2017/0208554 A1* | 7/2017 | Hoshino | ............ | H04W 52/146 |
| 2017/0245303 A1* | 8/2017 | Falconetti | ............ | H04W 74/0891 |

FOREIGN PATENT DOCUMENTS

| | | |
|---|---|---|
| CN | 101754267 A | 6/2010 |
| CN | 101867391 A | 10/2010 |
| CN | 102523074 A | 6/2012 |
| CN | 102761387 A | 10/2012 |
| CN | 102882653 A | 1/2013 |
| CN | 103297179 A | 9/2013 |
| EP | 1699177 A1 | 9/2006 |

\* cited by examiner

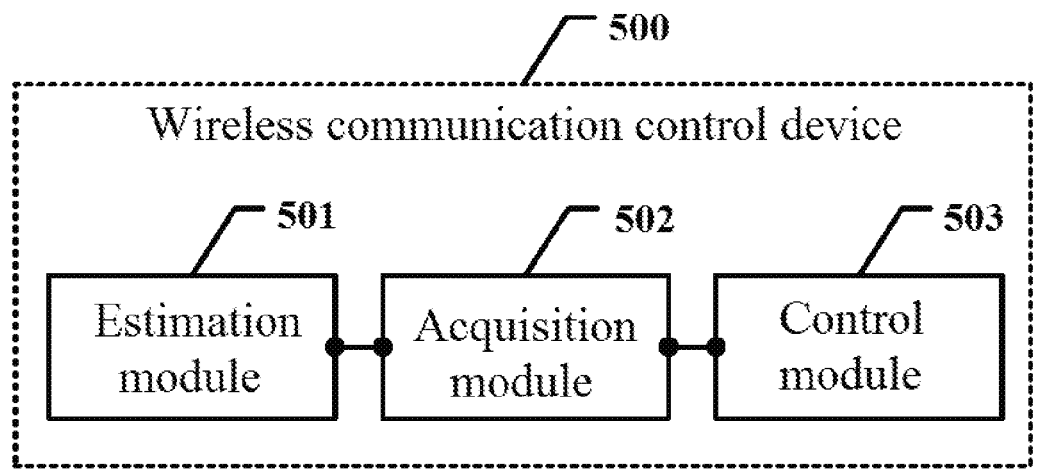
FIG. 5-a
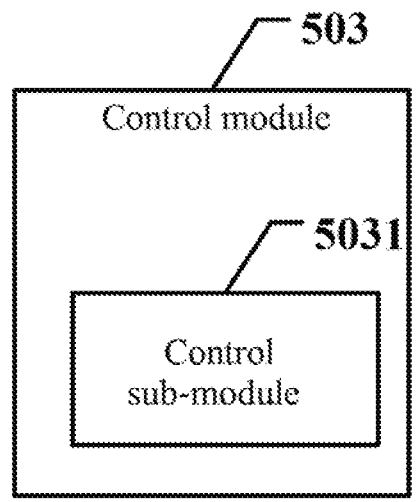
FIG. 5-b

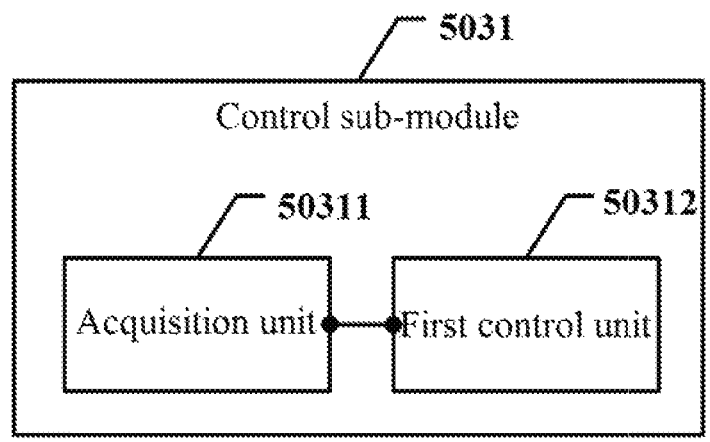
FIG. 5-c
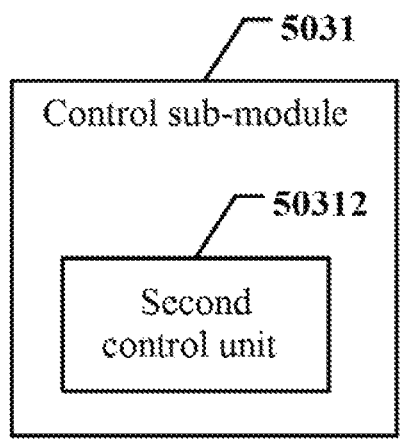
FIG. 5-d

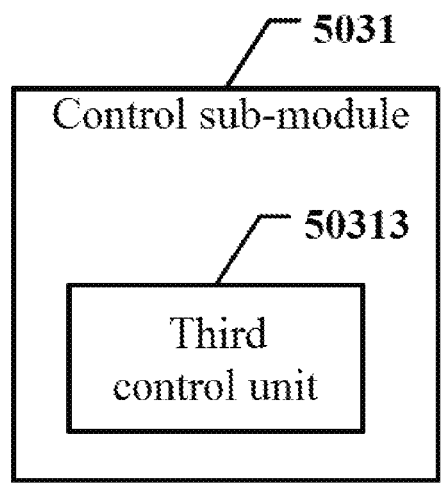
FIG. 5-e
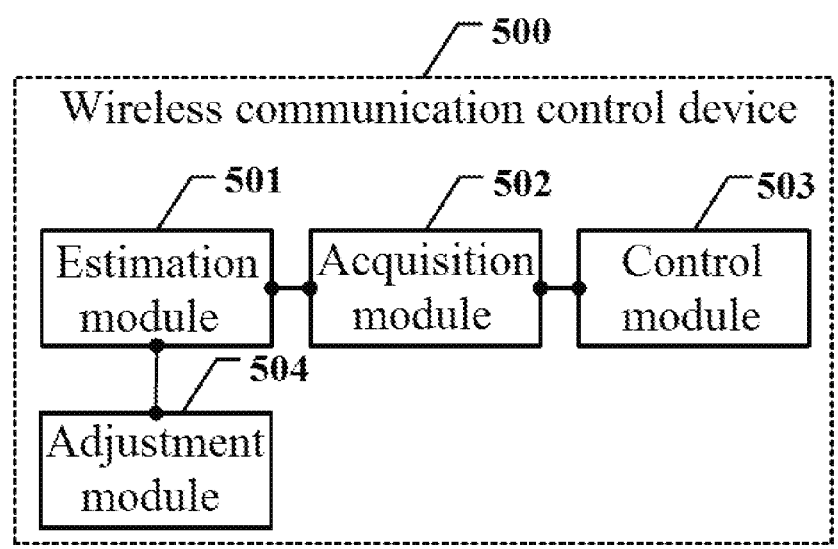
FIG. 5-f

WIRELESS COMMUNICATION CONTROL METHOD AND DEVICE

CROSS-REFERENCE TO RELATED APPLICATION

This application is a continuation application of International Application No. PCT/CN2015/075546, filed on Mar. 31, 2015, the entire contents of which are incorporated herein by reference.

TECHNICAL FIELD

The present disclosure relates to communication technology, and more particularly to a wireless communication control method and a wireless communication control device.

BACKGROUND OF THE DISCLOSURE

In wireless communication systems, a high throughput and data bandwidth can be achieved using a high-order modulation coding scheme (MCS) with good channel conditions. The MCS has to be degraded as the channel conditions deteriorate, otherwise a receiver may not properly demodulate. For example, the receiver may experience continuous errors and request re-transmission, and thus the throughput can become extremely low. Therefore, an appropriate MCS needs to be selected based upon changes in channel conditions to maximally utilize the communication resources. An inappropriate MCS may otherwise lead to a waste of the communication resources.

While in wireless communication control, especially in the communications in industrial scientific medical (ISM) unlicensed frequency bands, frequency resources can be extremely crowded as various types of devices perform wireless data transmissions in these frequency bands. As a result, a large amount of burst and unpredictable interfering signals can be generated, causing an inaccurate prediction of channel state and signal-to-interference-plus-noise ratio (SINR).

With conventional adaptive modulation coding (AMC) methods, a MCS is adjusted only based upon SINR information with a delay. In the ISM unlicensed frequency bands having significant burst interference, especially in communication systems having guaranteed ultra-low delay and restricted number of re-transmissions, conventional AMC methods may not respond quickly and may decrease the throughput and cause data errors.

SUMMARY OF THE DISCLOSURE

Embodiments of the disclosure provide a wireless communication control method and a wireless communication control device capable of accurately controlling a wireless communication scheme. The wireless communication control method and wireless communication control device are applicable to ISM unlicensed frequency bands having significant burst interference.

An aspect of the disclosure discloses a wireless communication control method, said method comprising: estimating a signal-to-interference-plus-noise ratio (SINR) of current channel based upon historical SINR measurements; obtaining a transmission error rate of current traffic; and determining a wireless communication control scheme based upon the SINR of current channel and the transmission error rate.

In some embodiments, determining the wireless communication control scheme based upon the SINR of current channel and the transmission error rate can comprise: determining the wireless communication control scheme coordinately using channel frequency hopping and modulation coding scheme (MCS) grade switching.

In some embodiments, determining the wireless communication control scheme coordinately using the channel frequency hopping and the MCS grade switching can comprise: obtaining a target MCS grade of current traffic by obtaining a MCS grade corresponding to a SINR mapping range within which the SINR of current channel locates, if the transmission error rate of current traffic is greater than a preset threshold; and decreasing a present MCS grade of current traffic to the target MCS grade of current traffic if the target MCS grade of current traffic is lower than the present MCS grade of current traffic.

In some embodiments, determining the wireless communication control scheme based upon the channel frequency hopping and the MCS grade switching can comprise: selecting whether the present MCS grade is to be changed or the current channel is to be switched based upon the number of channel switching in a predetermined period of time if the target MCS grade of current traffic is higher than or equal to the present MCS grade of current traffic.

In some embodiments, selecting whether the present MCS grade is to be changed or the current channel based upon the number of channel switching in a predetermined period of time can comprise: obtaining an optimal channel among currently available channels and switching the current channel to the optimal channel if the number of channel switching in the predetermined period of time is less than a predetermined threshold.

In some embodiments, obtaining the optimal channel among the currently available channels can comprise: obtaining an average background interference value of each one of the available channels by (1) obtaining scanning results of background noise of each one of the currently available channels, and (2) calculating, for each one of the currently available channels, a weighted average estimation of the scanning results of the background noise at a predetermined number of time points; and determining a channel having a minimal background interference from among all available channels based upon the average background interference values.

In some embodiments, obtaining the optimal channel among the currently available channels can further comprise: obtaining a peak scan value in the scanning results, which are obtained at the predetermined number of time points, of each one of the currently available channels; excluding channels corresponding to some peak scan values according to a preset criteria; and selecting a channel having a minimal average background interference value from remaining available channels as the optimal channel.

In some embodiments, excluding channels corresponding to some peak scan values according to the preset criteria can comprise: excluding channels corresponding to a preset number of large peak scan values among the peak scan values of the scanning results, or excluding channels corresponding to peak scan values greater than a preset value among the peak scan values of the scanning results.

In some embodiments, selecting whether the present MCS grade is to be changed or the current channel based upon the number of channel switching in a predetermined period of time can comprise: decreasing the present MCS grade to a preset MCS grade if the number of channel switching in the predetermined period of time is greater than or equal to a predetermined threshold.

In some embodiments, determining the wireless communication control scheme based upon the channel frequency hopping and the MCS grade switching can comprise:

adjusting the present MCS grade if the transmission error rate is less than or equal to a preset threshold.

In some embodiments, adjusting the present MCS grade can comprise: decreasing the present MCS grade of current traffic to a preset MCS grade if (1) the transmission error rate of current traffic or a transmission error rate of traffic in a predetermined period of time before current time is greater than 0, and (2) the present MCS grade of current traffic is greater than a MCS grade corresponding to a SINR mapping range within which the SINR of current channel locates.

In some embodiments, adjusting the present MCS grade can comprise: maintaining the present MCS grade of current traffic if (1) the transmission error rate of current traffic or a transmission error rate of traffic in a predetermined period of time before current time is greater than 0, and (2) the present MCS grade of current traffic is lower than or equal to a MCS grade corresponding to a SINR mapping range within which the SINR of current channel locates.

In some embodiments, adjusting the present MCS grade can comprise: if the transmission error rate of current traffic and a transmission error rate of traffic in a predetermined period of time before current time are both equal to 0; obtaining a target MCS grade of current traffic by obtaining a MCS grade corresponding to a SINR mapping range within which the SINR of current channel locates; and adjusting the present MCS grade of current traffic to the target MCS grade of current traffic.

In some embodiments, adjusting the present MCS grade of current traffic to the target MCS grade of current traffic can comprise: increasing the present MCS grade of current traffic with a preset hysteresis value if the present MCS grade is to be increased.

In some embodiments, said method can further comprise: obtaining channel scanning results, and calculating interference estimation results of channels associated with the channel scanning results; and correcting SINR mapping ranges corresponding to MCS grades based upon the interference estimation results.

In some embodiments, calculating the interference estimation results of the channels associated with the channel scanning results can comprise: obtaining the interference estimation results of channels by weighted average estimating the obtained scanning results of background noise of the channels.

In some embodiments, the weights used in calculating the weighted average estimation can be forgetting factors which become greater when they are closer to current time.

In some embodiments, the transmission error rate can comprise at least one of a packet error rate, a bit error rate, a block error rate or a frame error rate.

Another aspect of the disclosure discloses a wireless communication control device, said device comprising: an estimation module configured to estimate a signal-to-interference-plus-noise ratio (SINR) of current channel based upon historical SINR measurements; an acquisition module configured to obtain a transmission error rate of current traffic; and a control module configured to determine a wireless communication control scheme based upon the SINR of current channel and the transmission error rate.

In some embodiments, the control module can comprise a control sub-module configured to determine the wireless communication control scheme coordinately using channel frequency hopping and modulation coding scheme (MCS) grade switching.

In some embodiments, the control sub-module can comprise: an acquisition unit configured to obtain a target MCS grade of current traffic by obtaining a MCS grade corresponding to a SINR mapping range within which the SINR of current channel locates, if the transmission error rate of current traffic is greater than a preset threshold; and a first control unit, configured to decrease a present MCS grade of current traffic to the target MCS grade of current traffic if the target MCS grade of current traffic is lower than the present MCS grade of current traffic.

In some embodiments, the control sub-module can further comprise a second control unit configured to select whether the present MCS grade is to be changed or the current channel is to be switched based upon the number of channel switching in a predetermined period of time if the target MCS grade of current traffic is higher than or equal to the present MCS grade of current traffic.

In some embodiments, the second control unit can be configured to obtain an optimal channel among currently available channels and switch the current channel to the optimal channel if the number of channel switching in the predetermined period of time is less than a predetermined threshold.

In some embodiments, the second control unit can be configured to: obtain an average background interference value of each one of the available channels by (1) obtaining scanning results of background noise of each one of the currently available channels, and (2) calculating, for each one of the currently available channels, a weighted average estimation of the scanning results of the background noise at a predetermined number of time points; and determine a channel having a minimal background interference from among all available channels based upon the average background interference values.

In some embodiments, the second control unit can be further configured to obtain a peak scan value in the scanning results, which are obtained at the predetermined number of time points, of each one of the currently available channels; exclude channels corresponding to some peak scan values according to a preset criteria; and select a channel having a minimal average background interference value from remaining available channels as the optimal channel.

In some embodiments, the second control unit can be configured to exclude channels corresponding to a preset number of large peak scan values among the peak scan values of the scanning results, or exclude channels corresponding to peak scan values greater than a preset value among the peak scan values of the scanning results.

In some embodiments, the second control unit can be further configured to decrease the present MCS grade to a preset MCS grade if the number of channel switching in the predetermined period of time is greater than or equal to a predetermined threshold.

In some embodiments, the control sub-module can comprise a third control unit configured to adjust the present MCS grade if the transmission error rate is less than or equal to a preset threshold.

In some embodiments, the third control unit can be configured to decrease the present MCS grade of current traffic to a preset MCS grade if (1) the transmission error rate of current traffic or a transmission error rate of traffic in a predetermined period of time before current time is greater than 0, and (2) the present MCS grade of current traffic is greater than a MCS grade corresponding to a SINR mapping range within which the SINR of current channel locates.

In some embodiments, the third control unit can be configured to maintain the present MCS grade of current traffic if (1) the transmission error rate of current traffic or a transmission error rate of traffic in a predetermined period of time before current time is greater than 0, and (2) the present MCS grade of current traffic is lower than or equal to a MCS grade corresponding to a SINR mapping range within which the SINR of current channel locates.

In some embodiments, the third control unit can be configured to obtain a target MCS grade of current traffic by obtaining a MCS grade corresponding to a SINR mapping range within which the SINR of current channel locates if the transmission error rate of current traffic and a transmission error rate of traffic in a predetermined period of time before current time are both equal to 0; and adjust the present MCS grade of current traffic to the target MCS grade of current traffic.

In some embodiments, the third control unit can be configured to increase the present MCS grade of current traffic with a preset hysteresis value if the present MCS grade is to be increased.

In some embodiments, the device can further comprise an adjustment module configured to obtain channel scanning results and calculate interference estimation results of channels associated with the channel scanning results; and correct SINR mapping ranges corresponding to MCS grades based upon the interference estimation results.

In some embodiments, the adjustment module can be configured to obtain the interference estimation results of channels by weighted average estimating the obtained scanning results of background noise of the channels.

In some embodiments, the weights used in calculating the weighted average estimation can be forgetting factors which become greater when they are closer to current time.

In some embodiments, the transmission error rate can comprise at least one of a packet error rate, a bit error rate, a block error rate or a frame error rate.

It can be seen from the above technical solutions that the embodiments of the disclosure have the following advantages:

In the embodiments of the disclosure, the SINR of current channel can be estimated from historical SINR measurements, the transmission error rate of current traffic can be obtained, and the wireless communication control scheme can be determined based upon the SINR of current channel and the transmission error rate. The transmission error rate of current traffic can accurately reflect a quality of data transmission, therefore the wireless communication control scheme, which is determined based upon a combination of the transmission error rate of current traffic and the SINR of current channel, can more precisely control the wireless communication with a high sensitivity. The wireless communication control scheme thus determined can be applicable to ISM unlicensed frequency bands having significant burst interference.

BRIEF DESCRIPTION OF THE DRAWINGS

FIG. 5-*a* shows a structure of a wireless communication control device in accordance with embodiments of the disclosure;

FIG. 5-*b* shows a structure of a control module in accordance with embodiments of the disclosure;

FIG. 5-*c* shows a structure of a control sub-module in accordance with embodiments of the disclosure;

FIG. 5-*d* shows a structure of an alternative control sub-module in accordance with embodiments of the disclosure;

FIG. 5-*e* shows a structure of yet another control sub-module in accordance with embodiments of the disclosure; and FIG. 5-*f* shows a structure of an alternative wireless communication control device in accordance with embodiments of the disclosure.

DETAILED DESCRIPTION OF THE EMBODIMENTS

Embodiments of the disclosure provide a wireless communication control method and a wireless communication control device capable of accurately controlling a wireless communication scheme. The wireless communication control method and wireless communication control device are applicable to ISM unlicensed frequency bands having significant burst interference.

A better understanding of objectives, features and advantages of the disclosure will be obvious by reference to the following detailed description that sets forth illustrative embodiments with reference to the drawings. It will be apparent that, the embodiments described herein are merely provided by way of example only. Those skilled in the art can conceive other embodiments in light of the disclosed embodiments, and all these embodiments are within the scope of the disclosure.

As used in the description, claims and drawings of the disclosure, terms "first", "second" and the like are merely used to distinguish between similar objects, rather than indicating a specific order or sequence. It will be appreciated that, the terms thus provided can be interchangeable, and the use of these terms is intended to merely distinguish between objects having identical or similar properties in the embodiments of the disclosure. Additionally, terms "include", "comprise", "have" and any variations thereof are intended to denote non-exclusive inclusion. For example, a process, a method, a system, a product or a device having a number of components is not necessarily limited to include those explicitly listed components. Instead, other components, which are not explicitly listed or are intrinsic to the process, method, system, product or device, can be included.

A detailed description of the disclosure will be provided with reference to the drawings.

Figure 1:
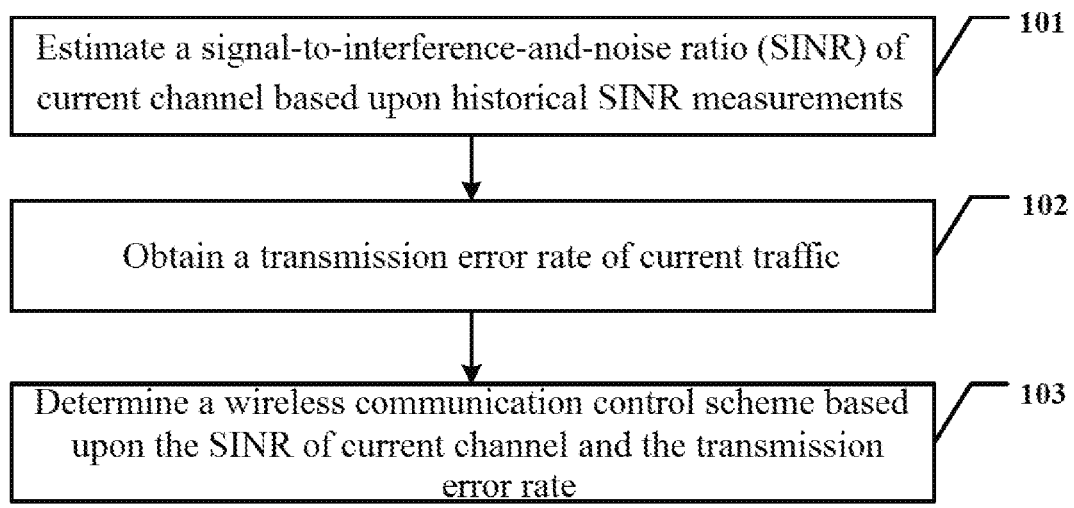
FIG. 1 shows a flowchart of a wireless communication control method in accordance with embodiments of the disclosure.

FIG. 1 shows a wireless communication control method in accordance with embodiments of the disclosure. The wireless communication method can be applicable to a wireless communication. The wireless communication method can comprise steps 101 to 103.

In step 101, a signal-to-interference-and-noise ratio (SINR) of current channel can be estimated based upon historical SINR measurements.

In some embodiments of the disclosure, in order to predict a data transmission performance of a channel (e.g., the channel to be controlled among all available channels), SINR measurements of current channel which are recorded before current time can be obtained. In other words, historical SINR measurements of current channel can be obtained. The SINR of current channel can be estimated based upon the historical SINR measurements.

For example, a plurality of SINR measurements before current time can be obtained by a channel estimator, and a SINR prediction can be performed based upon p preceding SINR measurements using the following equation:

$$SINR(n) = \sum_{k=1}^{p} a_k SINR(n-k)$$

where $a_k$ is a coefficient of a prediction filter, and p is the number of sampling points of the SINRs. In some instances, the coefficient $a_k$ can be a fixed value. Optionally, an adaptive filter can be used to adjust the coefficient $a_k$ in real-time. The value of p can be determined based upon the period of frequency sweep and the frequency of interference.

In step 102, a transmission error rate of current traffic can be obtained.

Prior to the wireless communication control, a transmission error rate of current traffic transmission can be obtained in addition to the SINR of current channel. In other words, an analysis on current traffic transmission can be performed to evaluate an error condition of the traffic transmission. In some instances, the transmission error rate can be used to evaluate the error condition of the traffic transmission. The transmission error rate can be obtained by calculating a rate at which traffic data is correctly transmitted within a period of time. The transmission error rate can comprise at least one of a packet error rate, a bit error rate, a block error rate or a frame error rate. It will be appreciated that, in actual wireless communication systems, the transmission error rate can be described in particular parameters according to the division unit of data.

In step 103, a wireless communication control scheme can be determined based upon the SINR of current channel and the transmission error rate.

Once the SINR of current channel and the transmission error rate of current traffic are obtained in the preceding steps, a precise understanding on various properties of the current channel and current traffic can be known from the SINR of current channel and the transmission error rate, such that the wireless communication control scheme can be determined based upon the SINR of current channel and the transmission error rate. The wireless communication control scheme can comprise controlling various contents in wireless communication, such as channel switching and modulation and coding selecting. The parameters to be controlled can be determined in view of specific application scenarios.

In the embodiment of disclosure described hereinabove, the SINR of current channel can be estimated from historical SINR measurements, the transmission error rate of current traffic can be obtained, and the wireless communication control scheme can be determined based upon the SINR of current channel and the transmission error rate. The transmission error rate of current traffic can accurately reflect a quality of data transmission, therefore the wireless communication control scheme, which is determined based upon a combination of the transmission error rate of current traffic and the SINR of current channel, can more precisely control the wireless communication with a high sensitivity. The wireless communication control scheme thus determined can be applicable to ISM unlicensed frequency bands having significant burst interference.

Figure 2:
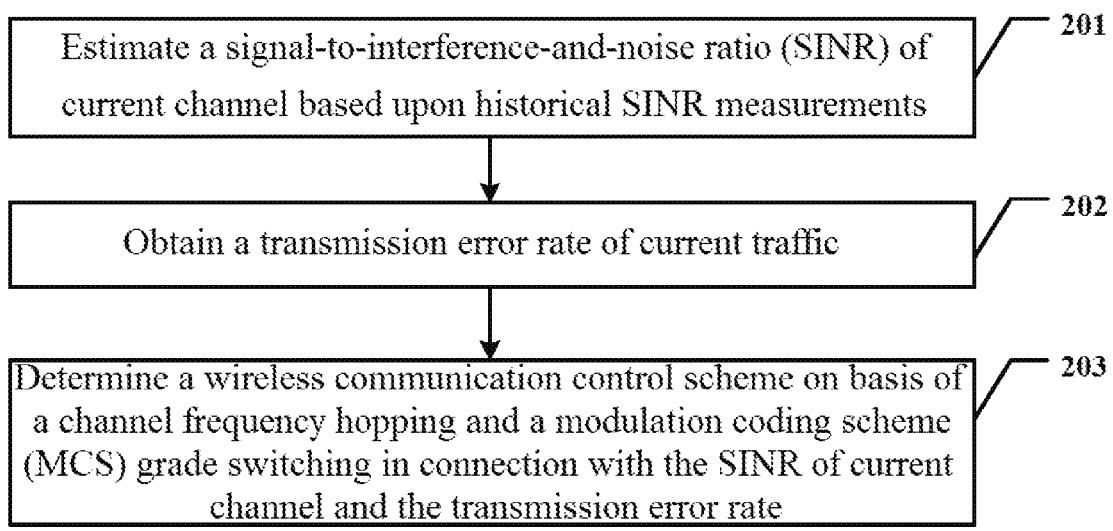
FIG. 2 shows a flowchart of an alternative wireless communication control method in accordance with embodiments of the disclosure.

FIG. 2 shows another embodiment of the disclosure. The wireless communication control method shown in FIG. 2 can comprise steps 201 to 203.

In step 201, a signal-to-interference-and-noise ratio (SINR) of current channel can be estimated based upon historical SINR measurements.

In step 202, a transmission error rate of current traffic can be obtained.

In step 203, a wireless communication control scheme can be determined based upon a channel frequency hopping and a modulation coding scheme (MCS) grade switching in connection with the SINR of current channel and the transmission error rate.

In some instances, steps 201 and 202 can be substantially similar to steps 101 and 102 as described in the embodiment discussed hereinabove.

In step 203, the wireless communication control scheme can be determined based upon the channel frequency hopping and MCS grade switching in connection with the SINR of current channel and the transmission error rate of current traffic. The channel frequency hopping can be a process in which a determination is made on (1) whether a frequency hopping is to be performed on current channel and (2) a target channel to be switched to based upon the SINR of current channel and the transmission error rate of current traffic. In some instances, a condition of the SINR of current channel and a threshold of the transmission error rate for triggering the channel frequency hopping can be determined in connection with particular application scenarios. In the MCS grade switching, a determination can be made on a target MCS grade based upon the SINR of current channel and the transmission error rate of current traffic. The transmission error rate of current traffic can accurately reflect a quality of data transmission, therefore the channel frequency hopping and MCS grade switching can be more precisely performed with a high sensitivity. The channel frequency hopping and MCS grade switching thus performed can be applicable to ISM unlicensed frequency bands having significant burst interference.

In some embodiments of the disclosure, the process of determining the wireless communication control scheme based upon the channel frequency hopping and MCS grade switching in step 203 can comprise steps A1 and A2.

In step A1, if the transmission error rate of current traffic is greater than a preset threshold, then a target MCS grade of current traffic can be determined by obtaining a MCS grade corresponding to a SINR mapping range in which the SINR of current channel locates.

In step A2, if the target MCS grade of current traffic is lower than a present MCS grade of current traffic, then the present MCS grade of current traffic can be decreased to the target MCS grade of current traffic.

In some instances, a preset threshold can be provided to the transmission error rate of respective traffic, and a determination can be made as to whether the transmission error rate of current traffic is greater than the preset threshold. For instances, the step A1 as discussed hereinabove can be performed if the transmission error rate of current traffic is greater than the preset threshold. The SINR mapping range can be a range of SINR values defined with two endpoint values. A SINR value can fall within a SINR mapping range in view of different endpoint values. Each SINR mapping range can correspond to one particular MCS grade. It will be appreciated that, different SINR ranges can correspond to different MCS grades, while each MCS grade can correspond to one particular SINR mapping range. A MCS grade corresponding to the SINR of current channel can be determined from the correspondence between the MCS grades and the SINR mapping ranges. For instance, three endpoint values (e.g., $SINR_1$, $SINR_2$ and $SINR_3$) can be provided to divide the entire SINR mapping range into four segments, each of which corresponding to one particular MCS grade. Accordingly, four MCSs can be provided (e.g., $MCS_0$, $MCS_1$, $MCS_2$ and $MCS_3$) to correspond to the four segments of the SINR mapping range. The correspondence between the MCS grades and the SINR mapping ranges is shown in Table 1.

TABLE 1

| MCS grade | MCS range | | SINR mapping range | |
|---|---|---|---|---|
| $MCS_0$ | $MCS_0\_L$ | $MCS_0\_H$ | $-\infty$ | $SINR_1$ |
| $MCS_1$ | $MCS_1\_L$ | $MCS_1\_H$ | $SINR_1$ | $SINR_2$ |
| $MCS_2$ | $MCS_2\_L$ | $MCS_2\_H$ | $SINR_2$ | $SINR_3$ |
| $MCS_3$ | $MCS_3\_L$ | $MCS_3\_H$ | $SINR_3$ | $+\infty$ |

As shown in Table 1, each MCS grade can correspond to one particular MCS range, and each MCS range can have a left endpoint value and a right endpoint value. The target MCS grade of current traffic can be known from the correspondence between the MCS grades and the SINR mapping ranges. In some embodiments, if a SINR is a critical value between two ranges, a lower one of two MCS grades corresponding to the SINR can be used. Alternatively, a higher one of the two MCS grades can be used according to a predetermined setting.

In step A1, the transmission condition of current traffic can be poor and a large amount of errors can be found in the transmission if the transmission error rate of current traffic is greater than a preset threshold. The preset threshold can be determined in view of practical conditions. The SINR mapping range within which the SINR of current channel locates can be determined, and then the target MCS grade of current traffic can be known from the correspondence between the SINR mapping ranges and the MCS grades. The target MCS grade of current traffic can be a theoretical MCS grade which is determined based upon the SINR of current channel. The present MCS grade of current traffic can be the actual MCS grade currently used, which can be different from the target MCS grade of current traffic. The present MCS grade of current traffic can be compared with the target MCS grade of current traffic prior to step A2. The step A2 can be performed to switch the present MCS grade of current traffic if the target MCS grade of current traffic is lower than the present MCS grade of current traffic. For instance, the target MCS grade of current traffic being lower than the present MCS grade of current traffic can indicate that the present MCS grade of current traffic is high and a lowering is needed, in which case the present MCS grade of current traffic can be decreased to the target MCS grade of current traffic.

In some instances, the preset threshold of the transmission error rate of current traffic can be provided based upon a type of the traffic being transmitted. For instance, in transmitting video signals, a transmission error rate (e.g., bit error rate) higher than the preset threshold may lead to a blur or interruption of the video, in which case it is necessary to decrease the MCS grade of current traffic.

It can be apparent from the description of steps A1 and A2 that, with the MCS switching self-adapting to transmission error rate, a system throughput can be maximized under a maximum bit error rate.

In further embodiments of the disclosure, the process of determining the wireless communication control scheme based upon the channel frequency hopping and MCS grade switching in step 203 can comprise a step B1.

In step B1, if the target MCS grade of current traffic is higher than or equal to the present MCS grade of current traffic, a determination can be made as to whether the MCS grade is to be changed or the channel is to be switched based upon the number of channel switching in a predetermined period of time.

In some instances, a preset threshold can be provided to the transmission error rate of respective traffic, and a determination can be made as to whether the transmission error rate of current traffic is greater than the preset threshold. When the transmission error rate of current traffic is greater than the preset threshold, the present MCS grade of current traffic can be compared with the target MCS grade of current traffic. If the target MCS grade of current traffic is higher than or equal to the present MCS grade of current traffic, the number of channel switching in a predetermined period of time can be obtained, based upon which a determination can be made as to whether the MCS grade is to be switched or the current channel is to be switched. In other words, a determination can be made as to whether a MCS grade switching or a frequency hopping is to be performed based upon the number of channel switching in the predetermined period of time. For example, if the number of channel switching of the system in a period of time (e.g., 2 seconds) before current time is more than two, the present MCS grade of current traffic can be adjusted. However, if the number of channel switching of the system in a period of time (e.g., 2 seconds) before current time is not more than two, then a channel switching can be performed. It will be appreciated that, the period of time can be 1 second, 3 seconds or 4 seconds, and the number of channel switching can be 1, 3, 4 or more.

In some embodiments of the disclosure, the process of determining whether the MCS grade is to be switched or the channel is to be switched based upon the number of channel switching in a predetermined period of time in step B1 can comprise a step B11.

In step B11, if the number of channel switching in the predetermined period of time is less than a predetermined threshold, then an optimal channel among currently available channels can be determined and the current channel can be switched to the optimal channel.

In some instances, a channel switching can be performed to the current channel if the number of channel switching in the predetermined period of time is small. For instance, the optimal channel can be selected from the currently available channels, and then the current channel can be switched to the optimal channel. In some instances, the optimal channel among the currently available channels can be the channel having best channel quality. The traffic can be transmitted on the optimal channel by switching the current channel of traffic to the optimal channel, thereby improving the throughput of traffic processing.

In some embodiments of the disclosure, the process of determining the optimal channel among the currently available channels in step B11 can comprise steps B111 and B112.

In step B111, an average background interference value of each one of the available channels can be obtained by (1)

obtaining scanning results of background noise of each one of the available channels, and (2) calculating, for each one of the available channels, a weighted average estimation of the scanning results of the background noise at a predetermined number of time points.

In step B112, a channel having a minimal background interference can be determined from among the available channels based upon the average background interference values.

In some instances, all available channels can be scanned in step B111. A background power of each one of the channels can be scanned to obtain the scanning results of the background noise of each one of the channels. Subsequently, the average background interference value of each one of the available channels can be obtained by calculating the weighted average estimation of the scanning results of each one of the available channels at the predetermined number of time points. The average background interference value can directly indicate the background interference of each one of the available channels. Next, step B112 can be performed to select the channel having minimal background interference as the optimal channel.

In some instances, a weight factor, which is used in obtaining the average background interference value by calculating the weighted average of the scanning results, can be a forgetting factor which becomes greater when it is closer to current time.

In further embodiments of the disclosure, in addition to steps B111 and B112, the process of determining the optimal channel among the currently available channels in step B11 can further comprise a step B113.

In step B113, a peak scan value in the scanning results, which are obtained at the predetermined number of time points, of each one of the available channels, can be obtained. Channels corresponding to certain peak scan values can be excluded according to a preset criteria, and a channel having a minimal average background interference value can be determined from the remaining available channels as the optimal channel. The predetermined number can be 5, 4, or another number.

In other words, in order to measure the background interference of each one of the available channels more accurately, the peak scan values can be excluded to improve a reliability of the weighted average estimation. The peak scan values can be excluded according to a preset criteria. The peak scan values which are not excluded can be used in calculating the weighted average, and then the channel having the minimal background interference (e.g., the minimum-interference channel) can be selected as the optimal channel.

In some instances, the process of excluding channels corresponding to some peak scan values according to a preset criteria in step B113 can comprise: excluding channels corresponding to a preset number of large peak scan values among the peak scan values of the scanning results, or excluding channels corresponding to peak scan values greater than a preset value among the peak scan values of the scanning results.

In other words, the preset criteria of excluding channels can be defined to exclude channels corresponding to a preset number of scan values or to exclude channels corresponding to scan values greater than a preset value. For example, the preset number can be two, in which case channels corresponding to the two largest peak scan values are excluded. For another example, an upper limit can be set, in which case any channels corresponding to peak scan values exceeding the upper limit are excluded. It will be appreciated that, the preset criteria of excluding channels as described herein above are provided by way of example only without limiting the present disclosure. The preset criteria of excluding channels can be otherwise provided in view of specific application scenarios.

In further embodiments of the disclosure, the process of determining whether the MCS grade is to be switched or the channel is to be switched based upon the number of channel switching in a predetermined period of time in step B1 can comprise a step B12.

In step B12, if the number of channel switching in the predetermined period of time is greater than or equal to a predetermined threshold, then the MCS grade can be decreased to a preset MCS grade.

In other words, if a large number of channel switching are performed in the predetermined period of time, no further channel switching needs to be performed to avoid a frequent channel switching. In this case, the present MCS grade of current traffic can be decreased to the preset MCS grade. For example, the present MCS grade of current traffic can be forced to decrease by one or two preset grades.

In further embodiments of the disclosure, the process of determining the wireless communication control scheme coordinately using the channel frequency hopping and MCS grade switching in step 203 can comprise a step C1.

In step C1, the MCS grade can be adjusted if the transmission error rate is less than or equal to a preset threshold.

In practical applications, the process of adjusting the MCS grade when the transmission error rate is less than or equal to the preset threshold can be implemented in various ways. Embodiments of implementing the process of adjusting the MCS grade will be provided by way of example.

In some embodiments of the disclosure, the process of adjusting the MCS grade in step C1 can comprise a step C11.

In step C11, the present MCS grade of current traffic can be decreased to a preset MCS grade if (1) the transmission error rate of current traffic or a transmission error rate of traffic in a predetermined period of time before current time is greater than 0, and (2) the present MCS grade of current traffic is higher than a MCS grade corresponding to a SINR mapping range within which the SINR of current channel locates.

In some instances, the transmission of current traffic can contain errors if the transmission error rate of current traffic or a transmission error rate of traffic in a predetermined period of time before current time is greater than 0, in which case a determination can be made as to whether the present MCS grade of current traffic is higher than a MCS grade corresponding to a SINR mapping range within which the SINR of current channel locates. The MCS grade corresponding to the SINR mapping range within which the SINR of current channel locates can be the target MCS grade of current traffic. The present MCS grade of current traffic can be decreased if the present MCS grade of current traffic is higher than the target MCS grade of current traffic. In some instances, the present MCS grade of current traffic can be decreased to the target MCS grade of current traffic. Optionally, the present MCS grade of current traffic can be decreased by a preset number of grades.

In some embodiments of the disclosure, the process of adjusting the MCS grade in step C1 can comprise a step C12.

In step C12, the present MCS grade of current traffic can be maintained if (1) the transmission error rate of current traffic or a transmission error rate of traffic in a predetermined period of time before current time is greater than 0, and (2) the present MCS grade of current traffic is lower than or equal to a MCS grade corresponding to a SINR mapping range within which the SINR of current channel locates.

A determination can be made as to whether the present MCS grade of current traffic is higher than a MCS grade corresponding to a SINR mapping range within which the SINR of current channel locates. The present MCS grade of current traffic can be appropriate if the present MCS grade of current traffic is lower than or equal to the MCS grade corresponding to the SINR mapping range within which the SINR of current channel locates (e.g., the present MCS grade of current traffic is lower than the target MCS grade of current traffic), in which case the present MCS grade of current traffic can be maintained to avoid unnecessary adjustment.

In some embodiments of the disclosure, the process of adjusting the MCS grade in step C1 can comprise steps C13 and C14.

In step C13, if the transmission error rate of current traffic and a transmission error rate of traffic in a predetermined period of time before current time are both equal to 0, then a target MCS grade of current traffic can be obtained by obtaining a MCS grade corresponding to a SINR mapping range within which the SINR of current channel locates.

In step C14, the present MCS grade of current traffic can be adjusted to the target MCS grade of current traffic.

In some instances, a determination can be made as to whether the transmission error rate of current traffic and a transmission error rate of traffic in a predetermined period of time before current time are both equal to 0 if the transmission error rate of current traffic is less than or equal to a preset threshold. The transmission of current traffic can be ideal (e.g., no transmission error) if the transmission error rate of current traffic and the transmission error rate of traffic in the predetermined period of time before current time are both equal to 0. The target MCS grade of current traffic can be known from the correspondence between the SINR mapping ranges and the MCS grades, such that the present MCS grade of current traffic can be changed to the target MCS grade of current traffic.

In further embodiments of the disclosure, the process of changing the present MCS grade of current traffic to the target MCS grade of current traffic in step C14 can comprise a step in which the present MCS grade of current traffic is increased with a preset hysteresis value if the present MCS grade is to be increased.

In some instances, in order to avoid a frequent adjusting of the MCS grade, a hysteresis value can be preset. The MCS grade can be increased after the SINR of current channel having being within a SINR mapping range corresponding to the new MCS grade for a certain time period. The hysteresis value can be determined based upon a stability and a throughput. With the hysteresis value, a frequent switching of the MCS grade can be avoided when the SINR is at a critical value.

In an alternative embodiment of the disclosure, in addition to the steps described in any of the embodiments discussed hereinabove, the wireless communication control method of the disclosure can further comprise steps D1 and D2.

In step D1, channel scanning results can be obtained, and interference estimation results of channels can be calculated associated with the channel scanning results.

In step D2, SINR mapping ranges corresponding to MCS grades can be corrected based upon the interference estimation results.

In some instances, a channel scan can be performed on available channels to obtain channel scanning results of the available channels. Interferences of the channels can be estimated based upon the channel scanning results (e.g., noise of the available channels), and thereby interference estimation results of the channels can be calculated. Endpoint values of SINR mapping ranges can be adjusted based upon the interference estimation results of the channels, such that the respective SINR mapping ranges corresponding to the respectively MCS grades can better reflect an actual interference of current channel and the MCS grade can be determined more precisely. For example, in case a significant background noise is found, the MCS grade corresponding to a corresponding SINR mapping range can be appropriately decreased to ensure a satisfactory communication and a system stability.

In some instances, the process of calculating the interference estimation results of the channels associated the channel scanning results in step D1 can comprise a step in which the interference estimation results of channels can be obtained by weighted average estimating the obtained scanning results of background noise of the channels.

In some embodiments, the weights used in calculating the weighted average estimation of the scanning results of the background noise of the channels can be forgetting factors which become greater when they are closer to current time.

In the embodiment of disclosure described hereinabove, a SINR of current channel can be estimated based upon historical SINR measurements. A transmission error rate of current traffic can be obtained, and a wireless communication control scheme can be determined based upon the SINR of current channel and the transmission error rate. The wireless communication control scheme, which is determined based upon a combination of the transmission error rate of current traffic and the SINR of current channel, can more precisely control the wireless communication with a high sensitivity as the transmission error rate of current traffic can accurately reflect a quality of data transmission. The wireless communication control scheme thus determined can be applicable to ISM unlicensed frequency bands having significant burst interference.

Exemplary application scenarios will be provided by way of example for better understanding and implementing the embodiments of the disclosure as discussed hereinabove.

Figure 3:
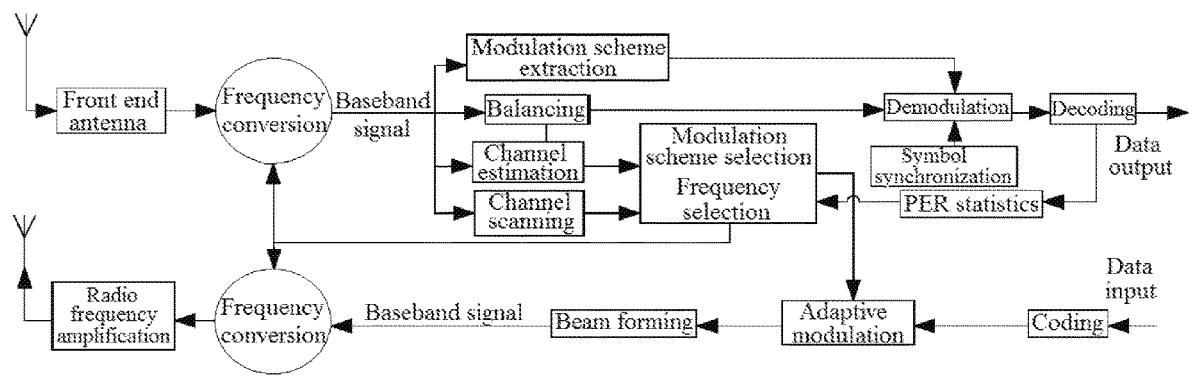
FIG. 3 shows the principle of traffic data processing in a wireless communication control method in accordance with embodiments of the disclosure.

FIG. 3 shows the principle of traffic data processing in a wireless communication control method in accordance with embodiments of the disclosure. A signal can be received at a front-end antenna, and a frequency conversion can be performed on the signal to obtain a baseband signal. A demodulation and a decoding can be performed once a modulation scheme is extracted to obtain an output data. A packet error rate (PER) statistics can be performed on the decoded data. A modulation coding scheme (MCS) and a frequency can be determined with reference to channel estimation results and channel scanning results. If a MCS grade is to be adjusted, the an adjustment result can be input to an adaptive modulation module, i.e., an adaptive modulation circuit, to adjust the MCS grade, such that an input data can be transmitted with the adjusted MCS grade. A radio frequency amplification can be performed on the input data subsequent to a beam forming and a frequency conversion, and the thus processed data can be output by an antenna.

Figure 4:
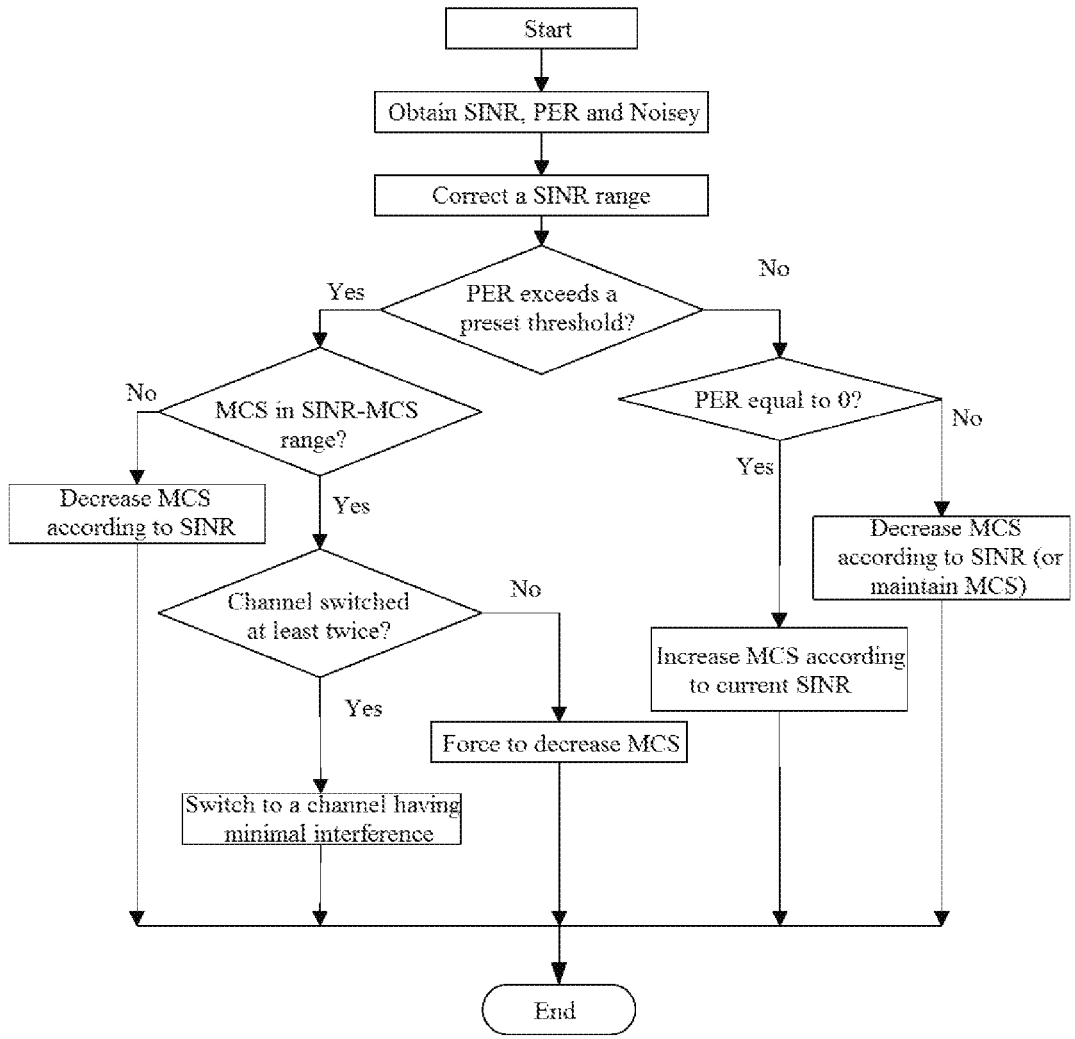
FIG. 4 shows an application scenario of a wireless communication control method in accordance with embodiments of the disclosure.

As shown in FIG. 3, an adaptive MCS can be determined based upon a result of channel estimation results, channel scanning results, and PERs before and after error retransmission fusion. A target MCS can be determined based upon a logical analysis of above discussed inputs. Meanwhile, channels can be sorted based upon the channel scanning results, and an adaptive frequency-hopping or a dynamic frequency selecting can be performed based upon the adaptive MCS. FIG. 4 shows an application scenario of a wireless communication control method in accordance with embodiments of the disclosure. The application scenario will be described with reference to FIG. 4 by way of example.

An adaptive modulation and frequency-hopping algorithm can be implemented with a number of processings.

In a first processing, historical SINR measurements of current channel can be obtained from a channel estimation module, i.e., a channel estimation circuit, to estimate the SINR of current channel, and a PER of current traffic can be obtained from a PER statistics module, i.e., a PER statistics circuit. Scanning results of background interference of available channels at n preceding time points can be obtained from a channel scanning module, i.e., a channel scanning circuit, to calculate interference estimation results of the channels.

In some instances, a SINR prediction can be calculated based upon p preceding SINR measurements obtained from a channel estimator using the equation $$SINR(n) = \sum_{k=1}^{p} a_k SINR(n-k),$$

where $a_k$ is a coefficient of a prediction filter. In some instances, the coefficient $a_k$ can be a fixed value. Optionally, an adaptive filter can be used to adjust the coefficient $a_k$ in real-time.

A respective minimum SINK, for respective $MCS_x$ under a limited $PER_{max}$ can be obtained from a baseband performance simulation. The value of x can be within a range from 0 to (m−1) in a system where m modulation coding schemes are used. A smaller $SINR_x$ can correspond to a smaller x. For example, in a communication system in which m=4, if the SINRs corresponding to $MCS_0$, $MCS_1$, . . . , $MCS_3$ satisfy a relation $SINR_0<SINR_1<SINR_2<SINR_3$, then a demodulation performance of $MCS_{x-1}$ can be better than that of $MCS_x$ at a fixed SINR. However, a throughput of $MCS_{x-1}$ can be less than that of $MCS_x$. A SINR–MCS mapping table can be obtained from the simulation. A SINR mapping range corresponding to a $MCS_x$ can be obtained from an equation $(MCS_x\_L, MCS_x\_H)=(SINR_x, SINR_{x+1}+3)$, where the 3 db is a hysteresis value of MCS switching which is provided to avoid a frequent MCS switching when the SINR oscillates at a boundary between operating ranges and to reduce a data bandwidth loss caused in switching the coding scheme. Boundaries can be found in SINR ranges corresponding to MCSs, for example, $(MCS_0\_L, MCS_0\_H)=(-\infty, SINR_1+3)$ $(MCS_{m-1}\_L, MCS_{m-1}\_H)=(SINR_{m-1}, +\infty)$. The MCS can be switched based upon the SINR. For instance, assuming the estimated signal-to-interference-and-noise ratio is SINR for the system currently operating with $MCS_x$, if SINR+ the hysteresis value$\geq MCS_x\_H$, then the MCS can be switched to $MCS_{x+1}$; if SINR<$MCS_x\_L$, then the MCS can be switched to $MCS_{x-1}$; otherwise, the $MCS_x$ can be maintained. With the adaptive MCS switching as discussed hereinabove, the system throughout can be maximized under a maximum bit error rate.

An average background interference value of an environment of current channel can be obtained from the channel scanning module. The channel scanning module can be configured to (1) periodically scan all available channels, and (2) store the scanning results which are obtained at n precedent time points for each one of the channels. A channel exclusion can be performed. In some instances, a peak scan value in the scanning results of each channel, which scanning results being obtained at n preceding time points, can be obtained. The peak scan values thus obtained can be sorted, and the channel corresponding to the largest peak scan value can be excluded. A weighted average of the scanning results of each channel can then be calculated from the remaining scanning results. In some instances, a weighted sum of the scanning results can be calculated using a forgetting factor for each one of the available channels in a chronological manner. For example, an average background interference value of they channel can be calculated from (n−1) scanning results with following equation:

$$Noise_y = Noise_y(n) + \rho \cdot Noise(n-1) + \rho^2 \cdot Noise(n-2) + \ldots + \rho^k \cdot Noise(n-k) + \ldots + \rho^{n-1} \cdot Noise_y$$

wherein y=0, 1, 2, . . . , k (different y representing different channels), and P is the forgetting factor. With this algorithm, the average background interference values of all available channels can be obtained.

An interference evaluation of the channels can be more accurate by introducing the peak value exclusion and weighted average, therefore, an optimal channel can be effectively selected.

In a second processing, a SINR mapping range corresponding to respective MCS can be corrected based upon the average background interference value of current channel.

In some instances, an optimal SINR operating range corresponding to respective $MCS_x$ can be corrected using the average background interference value of current channel with following equation:

$$(MCS_x\_L, MCS_x\_H) \rightarrow (MCS_x\_L + (Noise_y - (-95)), MCS_x\_H + (Noise_y - (-95)))$$

A starting point of background interference energy correction can be −95 dBm. For example, if the calculated average background interference value is −90 dBm, then an amount of (−90−(−95))dB=5 dB can be corrected, and a corrected relation between MCSs and SINR mapping ranges can be $(MCS_x\_L, MCS_x\_H)=(SINR_x+5, SINR_{x+1}+3+5)$. If the calculated average background interference value is less than or equal to the starting point −95 dBm, then no correction can be performed to the SINR mapping ranges.

Upon obtaining the average background interference value of each one of the available channels, the weighted average of background interference values of the remaining available channels can be sorted to obtain a channel having a minimal interference, for example, with the following equation: $Noise_{min}=Min(Noise_y)$, y=0, 1, 2, . . . , k. The channel having the $Noise_{min}$ can be used as the next alternative optimal channel.

In a third processing, a fourth processing can be performed if a PER of current traffic exceeds a preset threshold; otherwise, a fifth processing can be performed.

In the fourth processing, a target MCSc of current traffic can be calculated based upon the SINR of current channel from the SINR–MCS mapping. If the current MCS>MCSc, then the current MCS can be decreased to the target MCSc; otherwise, a determination can be made as to the number of channel switching in a predetermined period of time before current time. If less than 2 (e.g., only 0 or 1) channel switching occur in 2 seconds before current time, then the current channel can be switched to a channel corresponding to $Noise_{min}$ based on the average background interference value. However, if 2 or more channel switching occur in 2 seconds before current time, then the MCS can be forced to decrease by one grade. Upon completion of these processings, the adaptive modulation and frequency-hopping algorithm can be completed.

In the fifth processing, in case the current PER is greater than 0, the MCS grade can be decreased if in decrease in the MCS grade is suggested by the SINR according to the SINR-MCS mapping. In some instances, the MCS grade can be maintained if an increase in the MCS grade is suggested by the SINR. If the current PER is equal to 0 and a PER in a period of time before current time is also equal to 0, then the MCS grade can be adjusted according to the SINR-MCS mapping. Upon completion of these processings, the adaptive modulation and frequency-hopping algorithm can be completed.

As discussed in the embodiments of the disclosure, the adaptive frequency-hopping and adaptive modulation can be collectively used. An adaptive modulation and frequency-hopping in physical layer can be implemented based upon channel scanning results and PERs, such that a more accurate MCS adjustment can be performed by a wireless communication device operating in the ISM unlicensed frequency band having severe burst interference, and an interference suppression can be effected in a more timely manner. An optimal communication quality with a maximum throughput can be possible to the wireless communication device operating in the ISM unlicensed frequency band having severe burst interference. For instance, a MCS can be timely adjusted based upon a SINR and an operating channel can be timely switched based upon a PER in case of burst interference. The interference can be suppressed with a collective use of adaptive frequency-hopping and adaptive modulation even if the interference in current channel is not detected. The MCS can be quickly adjusted if the SINR decreases, such that a link can be rapidly restored to a stable transmission state. Therefore, an anti-interference capability can be improved without the need for continuous re-transmission, and thus a system delay can be reduced.

It will be apparent that, the methods of present disclosure as discussed hereinabove are described as a combination of processings merely for the sake of conciseness. However, it will be appreciated by those skilled in the art that, the present disclosure is not limited to the order of preforming the processings as described, and the processings can be performed in a different order or concurrently in the light of the disclosure. It will also be appreciated by those skilled in the art that, the embodiments as described hereinabove are merely illustrative embodiments.

Devices for implementing the technical solutions of present disclosure are provided to implement the embodiments of the disclosure.

As shown in FIG. 5-$a$, a wireless communication control device 500 in accordance with embodiments of the disclosure can comprise an estimation module 501, i.e., an estimation circuit, an acquisition module 502, i.e., an acquisition circuit, and a control module 503, i.e., a control circuit. In some instances, the estimation module 501 can be configured to estimate a signal-to-interference-plus-noise ratio (SINR) of current channel based upon historical SINR measurements. The acquisition module 502 can be configured to obtain a transmission error rate of current traffic. The control module 503 can be configured to determine a wireless communication control scheme based upon the SINR of current channel and the transmission error rate.

In some embodiments of the disclosure, as shown in FIG. 5-$b$, the control module 503 can comprise a control sub-module 5031, i.e., a control sub-circuit. In some instances, the control sub-module 5031 can be configured to determine the wireless communication control scheme coordinately using a channel frequency hopping and a modulation coding scheme (MCS) grade switching.

In some embodiments of the disclosure, as shown in FIG. 5-$c$, the control sub-module 5031 can comprise an acquisition unit 50311, i.e., an acquisition sub-sub circuit, and a first control unit 50312, i.e., a first control sub-sub circuit. In some instances, the acquisition unit 50311 can be configured to obtain a target MCS grade of current traffic by obtaining a MCS grade corresponding to a SINR mapping range within which the SINR of current channel locates, if the transmission error rate of current traffic is greater than a preset threshold. In some instances, the first control unit 50312 can be configured to decrease a present MCS grade of current traffic to the target MCS grade of current traffic if the target MCS grade of current traffic is lower than the present MCS grade of current traffic.

In some embodiments of the disclosure, as shown in FIG. 5-$d$, the control sub-module 5031 can comprise a second control unit 50313, a second control sub-sub circuit. In some instances, the second control unit 50313 can be configured to select whether the MCS grade is to be changed or the channel is to be changed based upon the number of channel switching in a predetermined period of time if the target MCS grade of current traffic is higher than or equal to the present MCS grade of current traffic.

In some embodiments of the disclosure, the second control unit 50313 can be configured to obtain an optimal channel among currently available channels and switch the current channel to the optimal channel if the number of channel switching in the predetermined period of time is less than a predetermined threshold.

In some embodiments of the disclosure, the second control unit 50313 can be configured to obtain an average background interference value of each one of the available channels by (1) obtaining scanning results of background noise of each one of the available channels, and (2) for each one of the available channels, calculating a weighted average estimation of the scanning results of the background noise at a predetermined number of time points; and determine a channel having minimal background interference from among the available channels based upon the average background interference values. In some instances, a weight factor, which is used to calculate the weighted average estimation as a weight, can be a forgetting factor which becomes greater when they are closer to current time.

In some embodiments of the disclosure, the second control unit 50313 can be further configured to: obtain a peak scan value in the scanning results, which are obtained at the predetermined number of time points, of each one of the available channels; exclude channels corresponding to certain peak scan values according to a preset criteria; and select a channel having a minimal average background interference value from the remaining available channels as the optimal channel.

In some embodiments of the disclosure, the second control unit 50313 can be configured to exclude channels corresponding to a preset number of large peak scan values among the peak scan values of the scanning results, or exclude channels corresponding to peak scan values greater than a preset value among the peak scan values of the scanning results.

In some embodiments of the disclosure, the second control unit 50313 can be further configured to decrease the MCS grade to a preset MCS grade if the number of channel switching in the predetermined period of time is greater than or equal to a predetermined threshold.

In some embodiments of the disclosure, as shown in FIG. 5-*e*, the control sub-module 5031 can comprise a third control unit 50314, i.e., a third control sub-sub unit. In some instances, the third control unit 50314 can be configured to adjust the MCS grade if the transmission error rate is less than or equal to a preset threshold.

In some embodiments of the disclosure, the third control unit 50314 can be configured to decrease the present MCS grade of current traffic to a preset MCS grade if (1) the transmission error rate of current traffic or a transmission error rate of traffic in a predetermined period of time before current time is greater than 0, and (2) the present MCS grade of current traffic is greater than a MCS grade corresponding to a SINR mapping range within which the SINR of current channel locates.

In some embodiments of the disclosure, the third control unit 50314 can be configured to maintain the present MCS grade of current traffic if (1) the transmission error rate of current traffic or a transmission error rate of traffic in a predetermined period of time before current time is greater than 0, and (2) the present MCS grade of current traffic is lower than or equal to a MCS grade corresponding to a SINR mapping range within which the SINR of current channel locates.

In some embodiments of the disclosure, the third control unit 50314 can be configured to: obtain a target MCS grade of current traffic by obtaining a MCS grade corresponding to a SINR mapping range within which the SINR of current channel locates if the transmission error rate of current traffic and a transmission error rate of traffic in a predetermined period of time before current time are both equal to 0; and change the present MCS grade of current traffic to the target MCS grade of current traffic.

In some embodiments of the disclosure, the third control unit 50314 can be configured to increase the present MCS grade of current traffic with a preset hysteresis value if the MCS grade is to be increased.

In some embodiments of the disclosure, as shown in FIG. 5-*f*, the device 500 can further comprise an adjustment module 504, i.e., an adjustment circuit. The adjustment module 504 can be configured to: obtain channel scanning results and calculate interference estimation results of channels associated with the channel scanning results; and correct SINR mapping ranges corresponding to MCS grades based upon the interference estimation results.

In some embodiments of the disclosure, the adjustment module 504 can be configured to obtain the interference estimation results of the channels by weighted average estimating the obtained scanning results of background noise of the channels.

In some embodiments of the disclosure, a weight used in calculating the weighted average estimation can be a forgetting factor which becomes greater when it is closer to current time.

In some embodiments of the disclosure, the transmission error rate can comprise at least one of a packet error rate, a bit error rate, a block error rate or a frame error rate.

It will be appreciated that, the principles in exchanging information between various modules (circuits)/units of the devices and implementing the devices as discussed hereinabove can be substantially identical to those in implementing the methods provided in embodiments of the disclosure with substantially the same technical effects. A detailed description of the embodiments of the devices will be omitted for conciseness.

With the wireless communication control device provided in embodiments of the disclosure, a SINR of current channel can be estimated based upon historical SINR measurements. A transmission error rate of current traffic can be obtained, and a wireless communication control scheme can be determined based upon the SINR of current channel and the transmission error rate. The wireless communication control scheme, which is determined based upon a combination of the transmission error rate of current traffic and the SINR of current channel, can precisely control the wireless communication with a high sensitivity as the transmission error rate of current traffic can accurately reflect a quality of data transmission. The wireless communication control scheme thus determined can be applicable to ISM unlicensed frequency bands having significant burst interference.

It will be appreciated that, the embodiments of the device as described hereinabove are merely illustrative. The units illustrated as separate parts may or may not be physically separated. The parts shown as units may or may not be physical units. For example, the parts can be provided at the same location or distributed over a plurality of network units. All or part of the modules can be selected to implement the embodiments of the disclosure according to actual requirements. In the drawings showing the device provided by the embodiments of the disclosure, a connection between modules indicate a communication connection therebetween, which can be implemented as one or more communication buses or signal lines. Those ordinary skilled in the art will appreciate and implement the disclosure without inventive efforts.

In light of the description of embodiments described hereinabove, it will be apparent to those skilled in the art that the present disclosure can be implemented by means of software plus essential general-purpose hardware. It is apparent that the present disclosure can optionally be implemented with dedicated hardware including application-specific integrated circuits (ASICs), dedicated CPUs, dedicated memories and dedicated elements. Functions implemented using computer programs can also be implemented using corresponding hardware. The same function can be implemented by various hardware configurations, such as analog circuits, digital circuits or dedicated circuits. The technical solution of the disclosure can be embodied in form of software product stored in a readable storage medium, such as a floppy disk, a flask disk, a removable hard drive, a read only memory (ROM), a random access memory (RAM), a magnet disk, or an optical disk, which stores instructions directing a computer (which can be a PC, a server or a network device) including a processor (such as a CPU or an ASIC) to perform a method in accordance with embodiments of the disclosure.

The foregoing embodiments are intended to merely illustrate rather than limit the disclosure. While the present disclosure has been described in detail with reference to the foregoing embodiments, it will be obvious to those skilled in the art that various changes, modifications or substitutions can be made to the embodiments or features thereof, without departing from the spirit and scope of the disclosure.

What is claimed is:

1. A wireless communication control method comprising:
measuring, by a signal acquisition circuit, a plurality of historical signal-to-interference-plus-noise ratios (SINRs) of a wireless channel before a current time;
estimating, by an estimation circuit having a processor, a current SINR of a current channel based upon the measured historical SINRs;
obtaining, by the signal acquisition circuit, a transmission error rate of a current traffic;

in response to the transmission error rate being greater than a preset threshold: obtaining a target modulation coding scheme (MCS) grade of the current traffic by a control circuit, the target MCS grade corresponding to a SINR mapping range within which the current SINR locates; performing a comparison between a present MCS grade and the target MCS grade; and performing a channel frequency hopping or adjusting the present MCS grade according to a comparison result between the present MCS and the target MCS; and in response to the transmission error rate being less than or equal to the preset threshold, adjusting the present MCS grade by the control circuit;

wherein performing the channel frequency hopping or adjusting the present MCS grade according to the comparison between the present MCS and the target MCS includes:

in response to the target MCS grade of the current traffic being lower than the present MCS grade of the current traffic, decreasing the present MCS grade of the current traffic to the target MCS grade of the current traffic; and in response to the target MCS grade of the current traffic being higher than or equal to the present MCS grade of the current traffic, obtaining an optimal channel among currently available channels and switching the current channel to the optimal channel if the number of channel switchings in the predetermined period of time is less than a predetermined threshold, and decreasing the present MCS grade to a preset MCS grade if the number of channel switchings in the predetermined period of time is greater than or equal to the predetermined threshold.

2. The method of claim 1, wherein obtaining the optimal channel among the currently available channels includes:
obtaining scanning results of background noise of the currently available channels;
obtaining an average background interference value of each one of the available channels by calculating, for each one of the currently available channels, a weighted average estimation of the scanning results of the background noise at a predetermined number of time points; and
determining a channel having a minimal background interference from the available channels based upon the average background interference values as the optimal channel.

3. The method of claim 1, wherein obtaining the optimal channel among the currently available channels further includes:
obtaining scanning results of background noise of the currently available channels;
obtaining an average background interference value of each one of the available channels by calculating, for each one of the currently available channels, a weighted average estimation of the scanning results of the background noise at a predetermined number of time points;
obtaining a peak scan value in the scanning results for each one of the currently available channels;
excluding channels corresponding to some peak scan values according to a preset criterion; and
selecting a channel having a minimal average background interference value from remaining available channels as the optimal channel.

4. The method of claim 3, wherein excluding channels corresponding to some peak scan values according to the preset criteria includes:

excluding channels corresponding to a preset number of large peak scan values among the peak scan values of the scanning results, or
excluding channels corresponding to peak scan values greater than a preset value among the peak scan values of the scanning results.

5. The method of claim 1, wherein adjusting the present MCS grade includes:
decreasing the present MCS grade of the current traffic to a preset MCS grade if:
the transmission error rate of the current traffic or a transmission error rate of a traffic in a predetermined period of time before a current time is greater than 0, and
the present MCS grade of the current traffic is greater than the MCS grade corresponding to the SINR mapping range within which the SINR of the current channel locates; and
maintaining the present MCS grade of the current traffic if:
the transmission error rate of the current traffic or the transmission error rate of the traffic in the predetermined period of time before the current time is greater than 0, and
the present MCS grade of the current traffic is lower than or equal to the MCS grade corresponding to the SINR mapping range within which the SINR of the current channel locates; and
if the transmission error rate of the current traffic and the transmission error rate of the traffic in the predetermined period of time before the current time are both equal to 0:
obtaining the target MCS grade of the current traffic by obtaining the MCS grade corresponding to the SINR mapping range within which the SINR of the current channel locates; and
adjusting the present MCS grade of the current traffic to the target MCS grade of the current traffic.

6. The method of claim 5, wherein adjusting the present MCS grade of the current traffic to the target MCS grade of the current traffic includes increasing the present MCS grade of the current traffic with a preset hysteresis value if the present MCS grade is to be increased.

7. The method of claim 1, further comprising:
obtaining channel scanning results;
calculating interference estimation results of channels associated with the channel scanning results; and
correcting SINR mapping ranges corresponding to MCS grades based upon the interference estimation results.

8. The method of claim 7, wherein calculating the interference estimation results of the channels associated with the channel scanning results includes obtaining the interference estimation results of channels by performing a weighted average estimation on the obtained scanning results of background noise of the channels.

9. A wireless communication control device comprising:
a processor; and
a memory storing instructions that, when executed by the processor, cause the processor to:
estimate a current signal-to-interference-plus-noise ratio (SINR) of a current channel based upon historical SINR measurements;
obtain a transmission error rate of current traffic;
in response to the transmission error rate being greater than a preset threshold: obtain a target modulation coding scheme (MCS) grade of the current traffic, the target MCS grade corresponding to a SINK mapping range within which the current SINK locates; perform a comparison between a present MCS grade the target MCS grade; perform a channel frequency hopping or adjust the present MCS grade according to a comparison between the present MCS and the target MCS;

in response to the transmission error rate being less than or equal to the preset threshold, adjust the present MCS grade by the control circuit;

in response to the transmission error rate of the current traffic being greater than a preset threshold and the target MCS grade of the current traffic being lower than a present MCS grade of the current traffic, decrease the present MCS grade of the current traffic to the target MCS grade of the current traffic;

in response the transmission error rate of the current traffic being greater than a preset threshold and the target MCS grade of the current traffic being higher than or equal to the present MCS grade of the current traffic, determine whether to change the present MCS grade or to switch the current channel based upon a number of channel switchings in a predetermined period of time; and in response to the transmission error rate being less than or equal to the preset threshold, adjust the present MCS grade.

10. The device of claim 9, wherein the instructions further cause the processor to:
obtain an optimal channel among currently available channels and switching the current channel to the optimal channel if the number of channel switchings in the predetermined period of time is less than a predetermined threshold, and decrease the present MCS grade to a preset MCS grade if the number of channel switchings in the predetermined period of time is greater than or equal to the predetermined threshold.

11. The device of claim 10, wherein the instructions further cause the processor to:
obtain scanning results of background noise of the currently available channels;
obtain an average background interference value of each one of the available channels by calculating, for each one of the currently available channels, a weighted average estimation of the scanning results of the background noise at a predetermined number of time points; and
determine a channel having a minimal background interference from the available channels based upon the average background interference values as the optimal channel.

12. The device of claim 10, wherein the instructions further cause the processor to:
obtain scanning results of background noise of the currently available channels;
obtain an average background interference value of each one of the available channels by calculating, for each one of the currently available channels, a weighted average estimation of the scanning results of the background noise at a predetermined number of time points;
obtain a peak scan value in the scanning results for each one of the currently available channels;
exclude channels corresponding to some peak scan values according to a preset criterion; and
select a channel having a minimal average background interference value from remaining available channels as the optimal channel.

13. The device of claim 12, wherein the instructions further cause the processor to:
exclude channels corresponding to a preset number of large peak scan values among the peak scan values of the scanning results, or
exclude channels corresponding to peak scan values greater than a preset value among the peak scan values of the scanning results.

14. The device of claim 9, wherein the instructions further cause the processor to:
decrease the present MCS grade of the current traffic to a preset MCS grade if:
the transmission error rate of the current traffic or a transmission error rate of a traffic in a predetermined period of time before a current time is greater than 0, and
the present MCS grade of the current traffic is greater than the MCS grade corresponding to the SINR mapping range within which the SINR of the current channel locates; and
maintain the present MCS grade of the current traffic if:
the transmission error rate of the current traffic or the transmission error rate of the traffic in the predetermined period of time before the current time is greater than 0, and
the present MCS grade of the current traffic is lower than or equal to the MCS grade corresponding to the SINR mapping range within which the SINR of the current channel locates; and
if the transmission error rate of the current traffic and the transmission error rate of the traffic in the predetermined period of time before the current time are both equal to 0:
obtain the target MCS grade of the current traffic by obtaining the MCS grade corresponding to the SINR mapping range within which the SINR of the current channel locates; and
adjust the present MCS grade of the current traffic to the target MCS grade of the current traffic.

15. The device of claim 14, wherein the instructions further cause the processor to:
increase the present MCS grade of the current traffic with a preset hysteresis value if the present MCS grade is to be increased.

16. The device of claim 9, wherein the instructions further cause the processor to:
obtain channel scanning results;
calculating interference estimation results of channels associated with the channel scanning results; and
correcting SINK mapping ranges corresponding to MCS grades based upon the interference estimation results.

17. The device of claim 16, wherein the instructions further cause the processor to:
obtain the interference estimation results of channels by performing a weighted average estimation on the obtained scanning results of background noise of the channels.

* * * * *